(12) United States Patent
Van Der Heide et al.

(10) Patent No.: US 12,445,720 B2
(45) Date of Patent: Oct. 14, 2025

(54) DEVICE AND METHOD FOR CONTROLLING A CAMERA

(71) Applicant: KONINKLIJKE PHILIPS N.V., Eindhoven (NL)

(72) Inventors: Ester Marjan Van Der Heide, 's-Hertogenbosch (NL); Fei Zuo, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 153 days.

(21) Appl. No.: 18/036,188

(22) PCT Filed: Nov. 10, 2021

(86) PCT No.: PCT/EP2021/081177
§ 371 (c)(1),
(2) Date: May 10, 2023

(87) PCT Pub. No.: WO2022/106269
PCT Pub. Date: May 27, 2022

(65) Prior Publication Data
US 2023/0412919 A1    Dec. 21, 2023

(30) Foreign Application Priority Data

Nov. 18, 2020 (EP) ..................... 20208465

(51) Int. Cl.
*H04N 23/667* (2023.01)
*G06V 20/40* (2022.01)
(Continued)

(52) U.S. Cl.
CPC ........... *H04N 23/667* (2023.01); *G06V 20/41* (2022.01); *G06V 20/52* (2022.01); *G06V 40/174* (2022.01);
(Continued)

(58) Field of Classification Search
CPC .... H04N 23/667; H04N 23/69; H04N 23/611; G06V 40/174; G06V 20/52; G06V 20/41; G06V 40/20
See application file for complete search history.

(56) References Cited

U.S. PATENT DOCUMENTS 8,085,302 B2    12/2011    Zhang
9,129,181 B1     9/2015    Nathan
(Continued)

FOREIGN PATENT DOCUMENTS

WO    2018083074 A1    5/2018
WO    2020127014 A1    6/2020

OTHER PUBLICATIONS

Paul, M., Haque, S.M.E. & Chakraborty, S. Human detection in surveillance videos and its applications—a review. EURASIP J Adv. Signal Process. 2013, 176 (2013).
(Continued)

*Primary Examiner* — Rowina J Cattungal

(57) ABSTRACT

A device (20) and method for controlling a camera (10) are provided. The device comprises an input unit (21) configured to obtain video data from the camera; an image processing unit (22) configured to determine from the obtained video data if a particular person is present alone in a first area monitored by the camera; a control unit (23) configured to generate a control signal for controlling the camera to operate in a first monitoring mode or a second monitoring mode based on the determination by the image processing unit if the particular person is present alone in the first area monitored by the camera; and an output unit (24) configured to output the control signal to the camera.

20 Claims, 7 Drawing Sheets

(51) Int. Cl.
    *G06V 20/52* (2022.01)
    *G06V 40/16* (2022.01)
    *G06V 40/20* (2022.01)
    *H04N 23/611* (2023.01)
    *H04N 23/69* (2023.01)
    *H04N 23/695* (2023.01)
    *G06V 40/10* (2022.01)

(52) U.S. Cl.
    CPC .......... *G06V 40/20* (2022.01); *H04N 23/611* (2023.01); *H04N 23/69* (2023.01); *G06V 40/15* (2022.01); *H04N 23/695* (2023.01)

(56) References Cited

U.S. PATENT DOCUMENTS

| | | | |
|---|---|---|---|
| 2007/0052803 A1 | 3/2007 | Chosak | |
| 2010/0013917 A1 | 1/2010 | Hanna | |
| 2010/0245532 A1 | 9/2010 | Kurtz | |
| 2011/0096149 A1 | 4/2011 | Au | |
| 2013/0077831 A1* | 3/2013 | Momozono | G06F 3/017 |
| | | | 382/107 |
| 2014/0046674 A1 | 2/2014 | Rosenfeld | |
| 2014/0078263 A1 | 3/2014 | Kim | |
| 2014/0092247 A1* | 4/2014 | Clark | G08B 21/0476 |
| | | | 348/143 |
| 2014/0235969 A1 | 8/2014 | Van Der Heide | |
| 2019/0046080 A1* | 2/2019 | Nishikado | G06V 20/41 |
| 2019/0082101 A1* | 3/2019 | Baldwin | H04N 23/632 |
| 2019/0192052 A1 | 6/2019 | Weffers-Albu | |
| 2019/0228866 A1 | 7/2019 | Weffers-Albu | |
| 2019/0251689 A1* | 8/2019 | Wang | G16H 30/20 |
| 2020/0196913 A1 | 6/2020 | Franz | |
| 2020/0267321 A1 | 8/2020 | Gupta | |
| 2022/0044046 A1* | 2/2022 | Fernando | G06V 20/52 |

OTHER PUBLICATIONS

Weon Sun-Hee; Joo Sung-I; Choi Hyung-IL: "Using Depth Information for Real-Time Face Detection : International Conference, HCI International 2014, Heraklion, Crete, Greece, Jun. 22-27, 2014. Proceedings, Part I", Springer Computer Vision, Pattern Recognition, Image Processing, and Graphics : 7th National Conference, NCVPRIPG 2019, Hubballi, India, Dec. 22-24, 2019.

Manoranjan Paul et al: "Human detection in surveillance videos and its applications—a review", Eurasip Journal on Advances in Signal Processing, vol. 2013, No. 1, Dec. 1, 2013 (Dec. 1, 2013), XP055638757, DOI: 10.1186/1687-6180-2013-176.

International Search Report Dated Jan. 26, 2022 For International Appln No. PCT/EP2021/081177 filed Nov. 10, 2021.

A long-range depth camera with configurable field of view and resolution, http://www.ocularrobotics.com/wp/wp-content/uploads/2015/12/MMT2015_MMT2015_61.pdf.

Brodsky, Tomas et al; "Visual Surveillance in Retail Stores and in the Home" Philips Research, Braircliff Manor, NY. Chapter 4.

* cited by examiner

DEVICE AND METHOD FOR CONTROLLING A CAMERA

CROSS-REFERENCE TO PRIOR APPLICATIONS

This application is the U.S. National Phase application under 35 U.S.C. § 371 of International Application No. PCT/EP2021/081177, filed on Nov. 10, 2021, which claims the benefit of European Application No. 20208465.3 filed on Nov. 18, 2020. These applications are hereby incorporated by reference herein.

FIELD OF THE INVENTION

The present invention relates to a device and method for controlling a camera, in particular a camera for monitoring a patient in a patient room of e.g. a hospital or rest home. The present invention relates further to a corresponding system.

BACKGROUND OF THE INVENTION

Increasingly, camera technology is being used in different wards in the hospital for remote and automatic monitoring. The camera is an unobtrusive sensor and gives a lot of information about the context of a certain measurement. In the intensive care unit (ICU), a camera can be of added value and can be used in applications as delirium monitoring, sleep monitoring, decubitus management, fall management, vital signs monitoring, etc.

For these applications, different aspects need to be robustly detected including subtle motions. For example, delirious patients manifest typical motion with the hand such as picking at the bedsheets. To be able to detect these small motions it is important to have a good field of view on the moving object.

There are different camera modalities such as RGB (color), infrared, or depth cameras, all having their advantages and disadvantages for the use in an ICU. The ICU environment is a dynamic environment with next to a lot of activity of staff and visitors also dynamic light conditions, position of the bed, etc. A depth camera has the advantage of being insensitive for light changes e.g. introduced by flashing monitoring lights, casting shadows, dark condition during the night.

Most depth cameras have fixed focal length but there are already camera platforms that support adjustable focal length (zoom) and mechanical movements (pan, rotation/tilt). A 3D depth camera with PTZ (Pan-Tilt-Zoom) function is thereby made possible. A PTZ camera gives the opportunity to precisely zoom in on subtle motion enhancing the detectability and the output of the particular measurement e.g. delirium score.

US 2020/0267321 A1 discloses a method of capturing an image of a scene. A current location of a plurality of objects in a frame of a video capturing the scene having one or more events of interest, is determined. For at least one of the events of interest, a time and a location for each of the plurality of objects associated with the event of interest is predicted based on the current location of the plurality of objects. A frame subset score is determined for each of a plurality of frame subsets in the frame, each of the plurality of frame subsets including one or more of the plurality of objects based on the predicted time and the predicted location for the event of interest. One of the determined plurality of frame subsets is selected based on the determined frame subset score. An image of the event of interest is captured using a camera, based on a camera orientation setting for the selected frame subset, where the captured image comprises the selected frame subset.

SUMMARY OF THE INVENTION

It is an object of the present invention to further exploit options to apply such camera for monitoring a person by a camera, e.g. a patient in an ICU, and controlling the camera to offer additional functions.

In a first aspect of the present invention a device for controlling a camera is presented comprising:
an input unit configured to obtain video data from the camera;
an image processing unit configured to determine from the obtained video data if a particular person is present alone in a first area monitored by the camera;
a control unit configured to generate a control signal for controlling the camera to operate in a first monitoring mode or a second monitoring mode based on the determination by the image processing unit if the particular person is present alone in the first area monitored by the camera, wherein the control signal is configured to control the camera to operate in the first monitoring mode in which the first area or a third area is monitored in case the particular person is not alone in the first area and to operate in the second monitoring mode in which a second area is monitored in case the particular person is alone in the first area, wherein the second area is smaller than the first area and substantially includes the particular person and the third area is larger than the second area but smaller than the first area and includes one or more persons, other than the particular person, present in the first area; and
an output unit configured to output the control signal to the camera.

In a further aspect of the present invention a system for monitoring an area is presented comprising:
a camera configured to operate in a first monitoring mode and a second monitoring mode according to a control signal,
a device as disclosed herein for generating and outputting a control signal to the camera.

In yet further aspects of the present invention, there are provided a corresponding method, a computer program which comprises program code means for causing a computer to perform the steps of the method disclosed herein when said computer program is carried out on a computer as well as a non-transitory computer-readable recording medium that stores therein a computer program product, which, when executed by a processor, causes the method disclosed herein to be performed.

Preferred embodiments of the invention are defined in the dependent claims. It shall be understood that the claimed method, system, computer program and medium have similar and/or identical preferred embodiments as the claimed system, in particular as defined in the dependent claims and as disclosed herein.

The present invention is based on the idea to make use of a camera for monitoring an area, such as an ICU room, and to control the camera based on an evaluation of the video data acquired by the camera to operate in one of at least two different monitoring modes. Switching from one monitoring mode hereby involves adjusting one or more of the settings of the camera, such as changing the viewing angle, the focus area, the zoom factor, etc.

Hereby, in the most general case, the monitoring modes are switched based on whether or not a particular person, e.g. a patient to be mainly monitored, is present in a first area, e.g. in the room that is viewed in the first monitoring mode (also called scene or room monitoring mode). If the particular person is alone in the first area (i.e. no other persons are present in the room), the camera is switched into the second monitoring mode (also called patient monitoring mode) in which e.g. only the particular person (i.e. the patient as lying in the bed or sitting in a chair) is monitored so that camera zooms in to the particular person. If, on the other hand, one or more other persons are present in the first area, the camera is switched into (or remains in) the first monitoring mode in which either complete first area or a third area (e.g. an area in which some or all of the other persons are located) is monitored. Thus, in an implementation of the present invention, one or more camera settings may be adjusted to best suit ongoing activities in a room.

In a realistic scenario, the present invention may be useful to avoid false or unnecessary alarms. For instance, if the camera is used to detect if the patient is in risk to fall off the bed or to detect one or more vital signs (such as heart rate, respiration rate, oxygen saturation (SpO2), etc.) and thus is focused on the patient and the bed, there may be situations in which an alarm is issued (e.g. on a central monitoring screen and/or caregiver's mobile device) if a patient moves to the edge of the bed so that he might fall off the bed or if a particular vital sign indicates a critical situation. If, however, it is known that another person (e.g. a nurse or caregiver) is present in the room as well, which information can be obtained if the camera is switched into the first monitoring mode as soon as it is detected that one or more other persons in addition to the patient, such an alarm becomes unnecessary and can be suppressed since the other person is already present in the room and can directly recognize the patient's critical situation and take appropriate action.

Another scenario where detection of the presence of another person in the room makes sense is if the camera is used for detecting delirium or epileptic seizure. Furthermore, the camera may be switched into a mode where small motions of the patient are detected to enable the ability and reliability of motion detection and recognition of delirium or an epileptic seizure.

In another embodiment in-bed motion focusing may be performed. The patient motion while lying on bed provides important hints for delirium detection, such as picking at bedsheets. By motion detection small motions of the patient can be captured and the camera can be zoomed in for better details. This is not only done for better visualization but also provides better (high-resolution) inputs for algorithms that are used for further analysis of these subtle motion. For detecting delirium from subtle motion a method as e.g. described in US 2014/235969 A may be used.

In an embodiment the image processing unit is configured to determine from the obtained video data if the particular person is present alone in the first area by detecting activities in the first area and determining if the activities represent motion of one or more persons. Such an embodiment can be easily implemented and provides reliable results.

In a particular embodiment the image processing unit is further configured to determine, in case one or more other persons are detected in the first area, if one or more of them is within or overlapping with or adjacent to the second area. Further, the control unit is configured to generate, in case one or more of the other persons is within or overlapping with or adjacent to the second area, a control signal for controlling the camera to operate in the first monitoring mode and to monitor the third area substantially including the particular person and the one or more of the other persons. Thus, if there are one or more persons close to the particular person, e.g. if there are one or more caregivers or relatives close to the patient, the area around the patient shall be monitored so that not only the patient but also the person(s) adjacent to the patient is (are) monitored to have a better understanding if and what happens to the patient.

The control unit may further be configured to generate, in case none of the other persons is within or overlapping with or adjacent to the second area, a control signal for controlling the camera to operate in the second monitoring mode or to operate in the first monitoring mode and to monitor the first area. Hence, in the example of monitoring a patient room, if there are no persons adjacent to the patient, the camera shall either zoom on the patient or monitor the whole room.

In another embodiment the image processing unit is configured to detect in the obtained video data a particular furniture, in particular a bed or chair (e.g. a patient bed in hospital's patient room or a relaxing chair in a rest home), to determine if the particular person is present on or at said furniture and to define the area substantially including the particular furniture on or at which the particular person is present as second area. For instance, the particular furniture may be detected and it may be determined if the particular person is present on or at said furniture based on depth information of said video data. Depth information may e.g. be obtained from a 3D or depth camera.

The image processing unit is configured to correct obtained video data by correcting the viewing angle of the camera such that a ground plane is arranged is horizontal direction and to use the corrected video data for determining if a particular person is present alone in the first area. With such a correction it is easier to determine distances and detect spatial relationships of persons and things detected in the video data. Further, this helps to detect e.g. a particular furniture such as a patient bed.

Rather than computing a correction of the video data, in another embodiment the control unit is configured to generate a control signal for controlling the camera to rotate such that a ground plane is arranged in horizontal direction.

In another embodiment the image processing unit is configured to perform, in the second monitoring mode, one or more of a facial expression analysis of facial expressions of the particular person, a bed exit detection to detect if the particular person has exited or entered or is in risk to fall off the bed, a motion detection to detect specific motions of the particular person, a vital sign detection to detect one or more vital signs of the particular person, and an approach detection to detect if one or more other persons approach or leave the particular person. Thus, various options exist which may be used alternatively or in combination depending on user requirements or general needs or applications of the device and method of the present invention.

The camera of the proposed system may be configured to pan and/or to tilt and/or to zoom under control of the control signal. For instance, a 3D pan-tilt-zoom (PTZ) camera may be used. The camera may be configured to be fixedly mounted in a room (e.g. on the ceiling or a wall) or to be movably positioned in a room (e.g. via a movable stand or tripod).

Advantageously, the system may further comprise a fish eye camera configured to always monitor the first area or an even larger area. Thus, in addition to the above-mentioned camera which is controlled to monitor different areas, monitoring of the first area (e.g. a patient room from a particular view) or an even larger area (e.g. a wider view and thus a larger area of the patient room) is always possible in this way.

BRIEF DESCRIPTION OF THE DRAWINGS

These and other aspects of the invention will be apparent from and elucidated with reference to the embodiment(s) described hereinafter. In the following drawings.

DETAILED DESCRIPTION OF THE INVENTION

Figure 1:
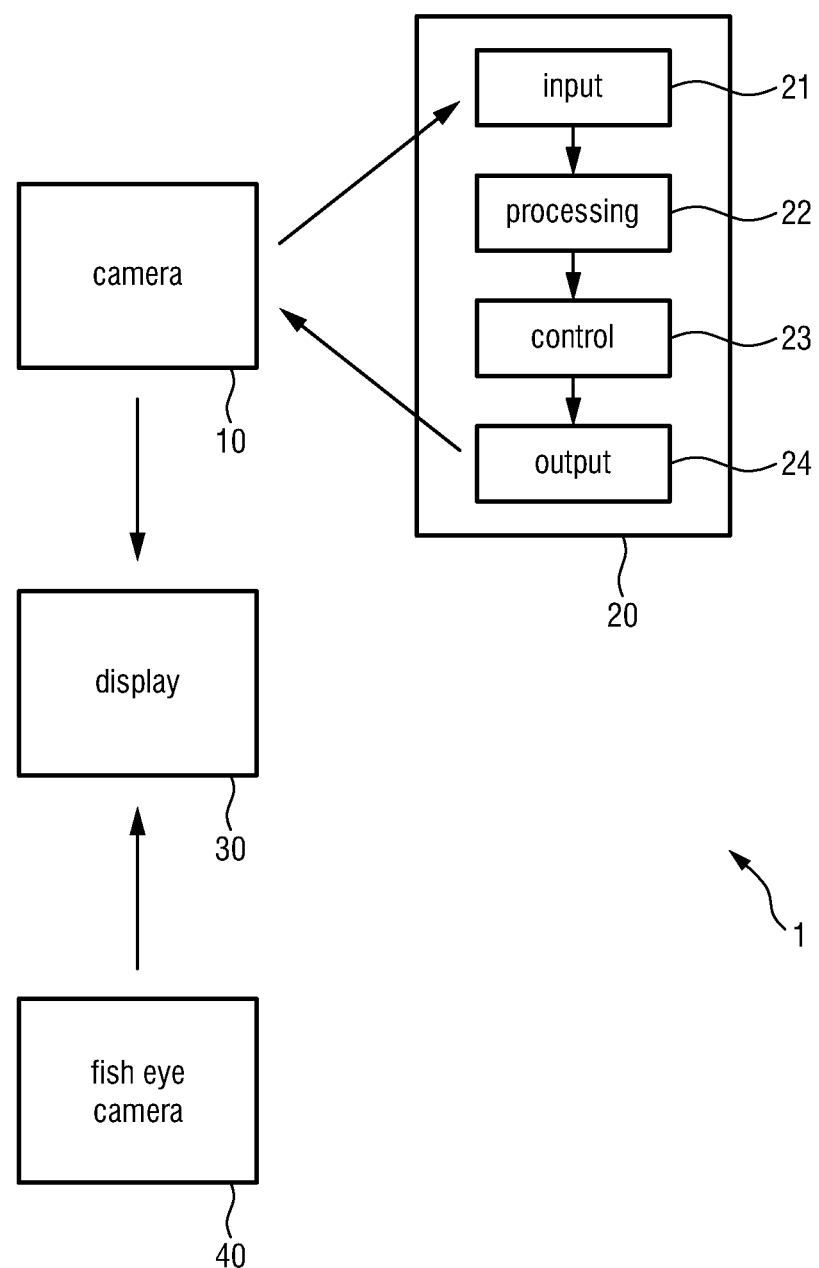
FIG. 1 shows a schematic diagram of a system and device according to the present invention.

FIG. 1 shows a schematic diagram of a system 1 and device 20 according to the present invention. The system comprises at least a camera 10 that can operate in a first monitoring mode and a second monitoring mode according to a control signal and a device 20 for generating and outputting a control signal to the camera. For this purpose, the device 20 obtains (e.g. receives or retrieves) video data acquired by the camera 10 and evaluates them.

The device 20 comprises an input unit 21 for obtaining the video data from the camera. The input unit 21 may e.g. be a data interface for receiving the video data via a wired or wireless connection with the camera, e.g. via a WLAN or LAN connection.

The device 20 further comprises an image processing unit 22, e.g. a processor or computer, for determining from the obtained video data if a particular person, e.g. a patient, is present alone in a first area monitored by the camera 10.

The device 20 further comprises a control unit 23, e.g. a controller, processor or computer (e.g. the same processor or computer that implements the image processing unit 22) for generating a control signal for controlling the camera 10 to operate in a first monitoring mode or a second monitoring mode based on the determination by the image processing unit 22.

The device 20 further comprises an output unit 24 for outputting the control signal to the camera. The output unit 24 may e.g. be a data interface for transmitting the control signal via a wired or wireless connection with the camera, e.g. via a WLAN or LAN connection.

The device 20 may be implemented in hard- and/or software. For instance, the device 20 may be implemented as appropriately programmed computer or processor. Depending on the application, the device 20 may e.g. be a computer or a workstation or a mobile user device, such as a smartphone, laptop, tablet, smart watch. For instance, in an application in a hospital or rest home, the device 20 may be implemented on a caregiver's smartphone so that the caregiver can always monitor the patient or gets new monitoring information if e.g. the monitoring mode changes. In another application, the device 20 may be implemented on a computer in a central monitoring room in which many patient rooms are centrally supervised.

The system 1 may further comprise a display 30, e.g. a computer monitor or the display of a mobile user device, for displaying the video acquired by the camera 10. Still further, a fish eye camera 40 may be provided to always monitor the first area or an even larger area even if the camera 10 switches between different monitoring modes.

Figure 2:
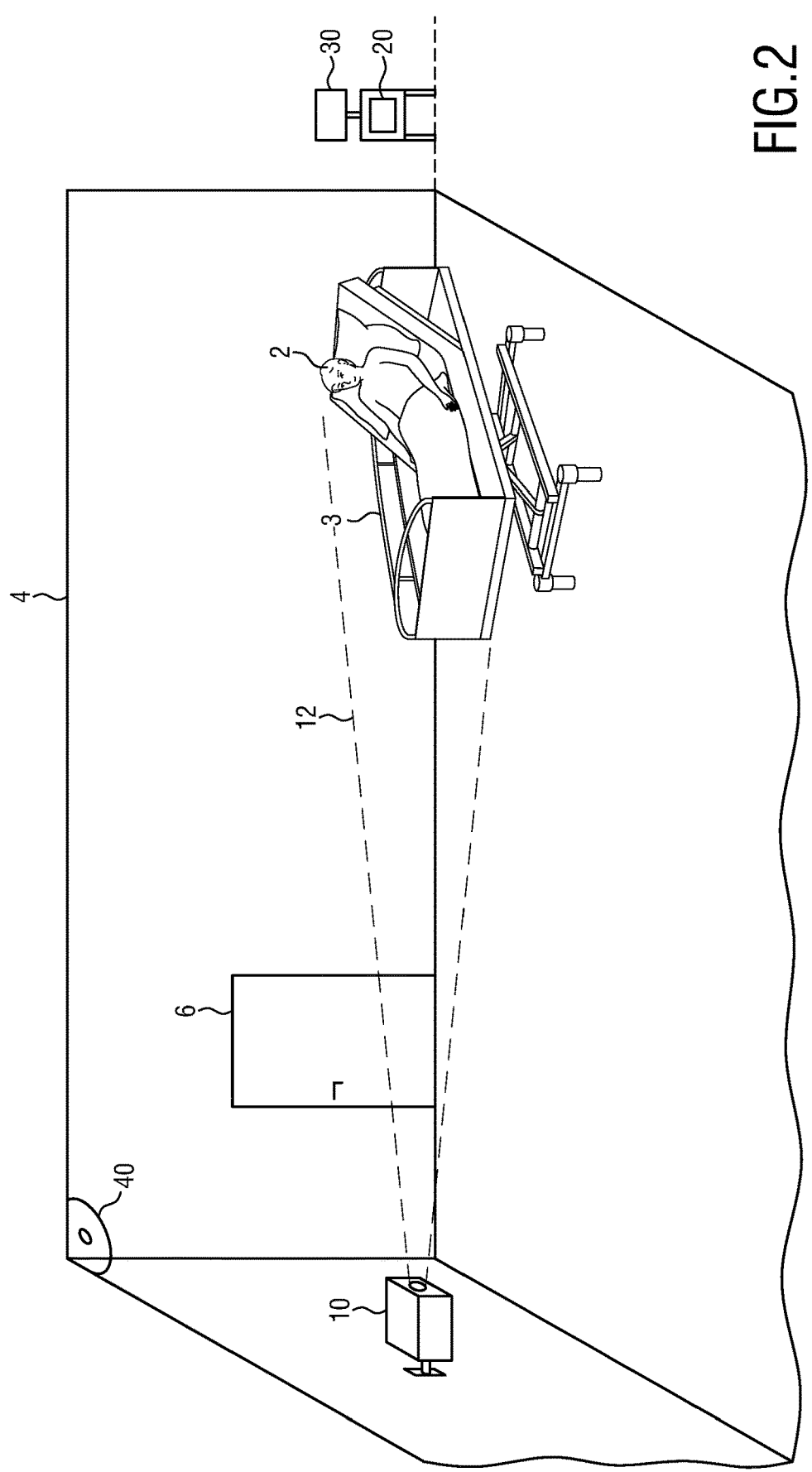
FIGS. 2 to 4 show different situations of a realistic scenario in which the present invention may be applied.
Figure 3:
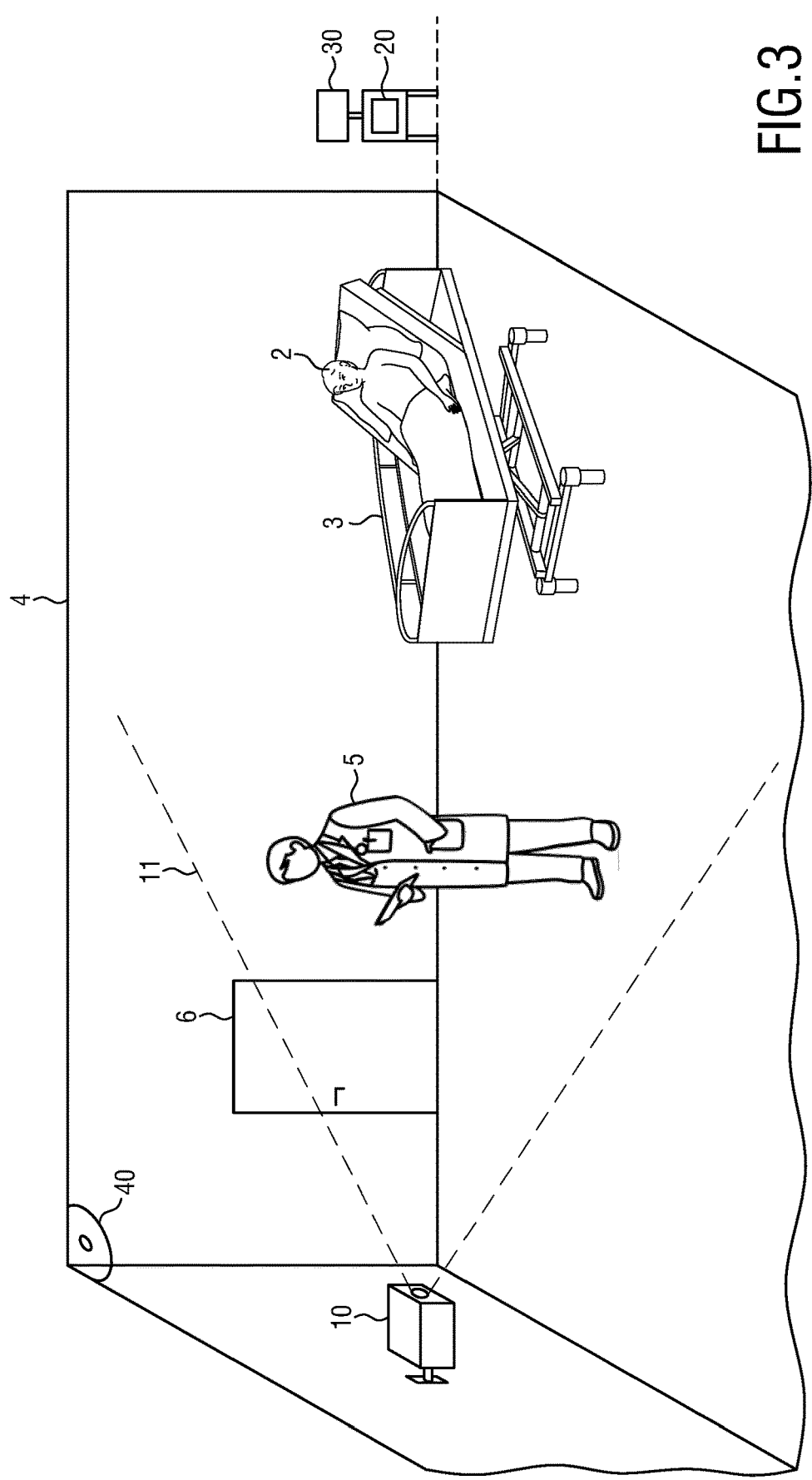
Figure 4:
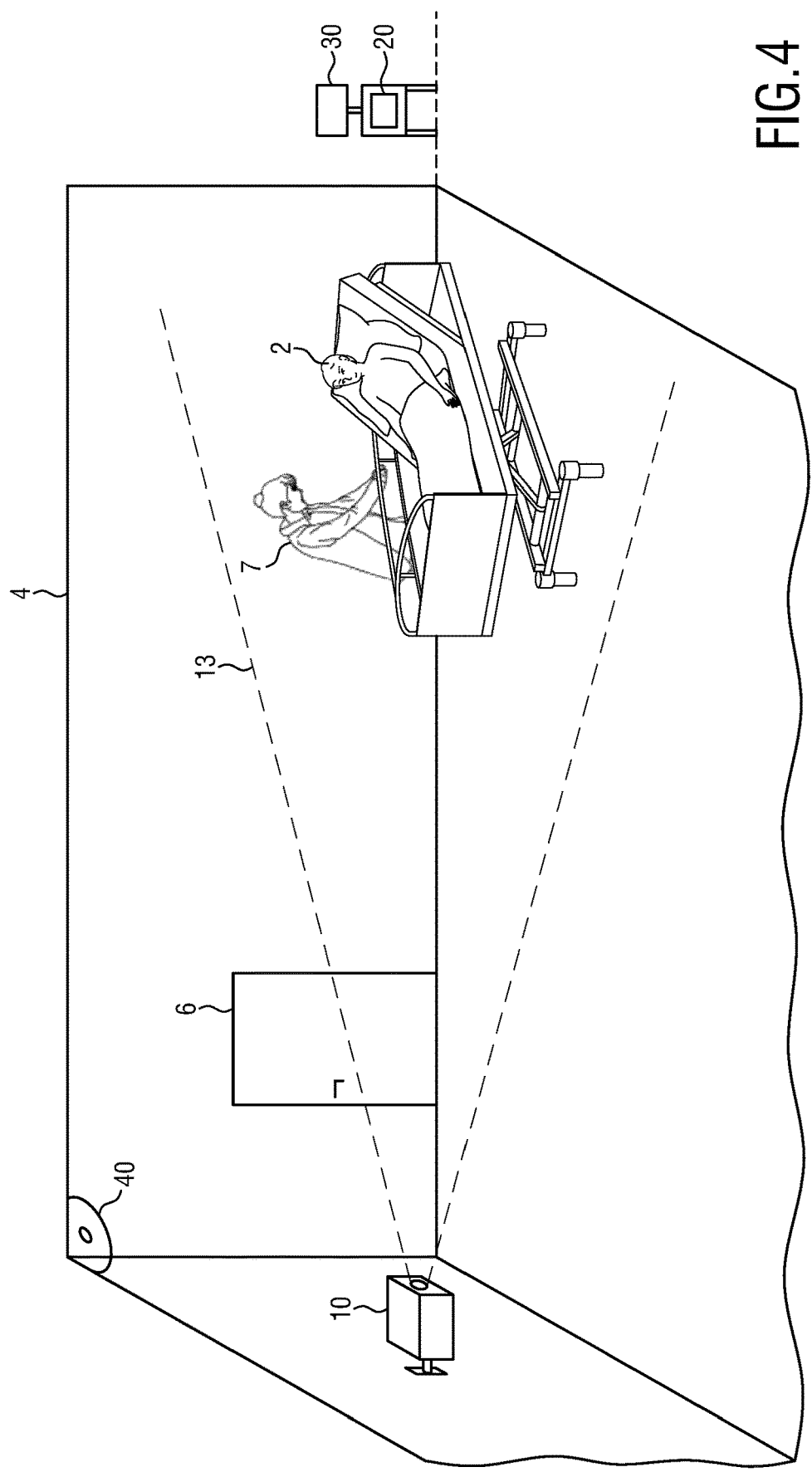

FIGS. 2 to 4 show different situations of a realistic scenario in which the present invention may be applied. In this scenario, a patient 2 is lying in a patient bed 3 in a hospital's patient room 4. The camera 10, e.g. a 3D PTZ camera, is mounted at a wall (or the ceiling) and is able to pan, tilt and rotate. The optional fish eye camera 40 is mounted in an upper corner of the room 4. The device 20 and the display 30 may be located in another room, e.g. a central monitoring room.

The control signal generated by the device 20 controls the camera 10 to operate in the first monitoring mode or in the second monitoring mode. In the first monitoring mode a first area 11 or a third area 13 is monitored in case the particular person is not alone in the first area. In the second monitoring mode a second area 12 is monitored in case the particular person is alone in the first area. This shall be explained with reference to the situation illustrated in FIGS. 2 to 4.

In the situation shown in FIG. 2 the patient 2 is alone in the patient room 4 (e.g. an ICU room) so that the camera 10 is controlled to operate in the second monitoring mode. In this case a second area 12 is monitored, which is substantially the area of the patient 2 itself and substantially includes the patient 2 or part of the patient 2 (e.g. the patient's face or upper part of the body).

In the situation shown in FIG. 3 the patient 2 is not alone in the patient room 4 but another person 5, e.g. a caregiver or doctor or visitor, is present in the room 3 so that the camera 10 is controlled to operate in the first monitoring mode. In this situation the other person 5 is present in the area of the door 6. A first area 11 is thus monitored, which may be the maximum field of view of the camera 10. In the scenario shown in FIG. 3 the first area 11 is almost the complete patient room 4 as far as it can be seen by the camera 10.

In the situation shown in FIG. 4 the patient 2 is again not alone in the patient room 4 but another person 7, e.g. a caregiver or doctor or visitor, is present in the room 3 so that the camera 10 is again controlled to operate in the first monitoring mode. In this situation the other person 7 is present in the area of the bed 3. A third area 13 is thus monitored, which may be region around the bed 3 so that in includes the patient 2 and the other person 7.

Hence, as illustrated in the situations shown in FIGS. 2 to 4, the second area 12 is smaller than the first area 11 and substantially includes the particular person 2 and the third area 13 is larger than the second area 12 but smaller than the first area 11 and includes one or more persons 5, 7, other than the particular person 2, present in the first area 11.

Thus, according to the present invention one or more settings (e.g. focus area and/or zoom level) of the 3D PTZ camera are automatically adapted based on the current activities in the room and a scene analysis to achieve optimal monitoring results.

Figure 5:
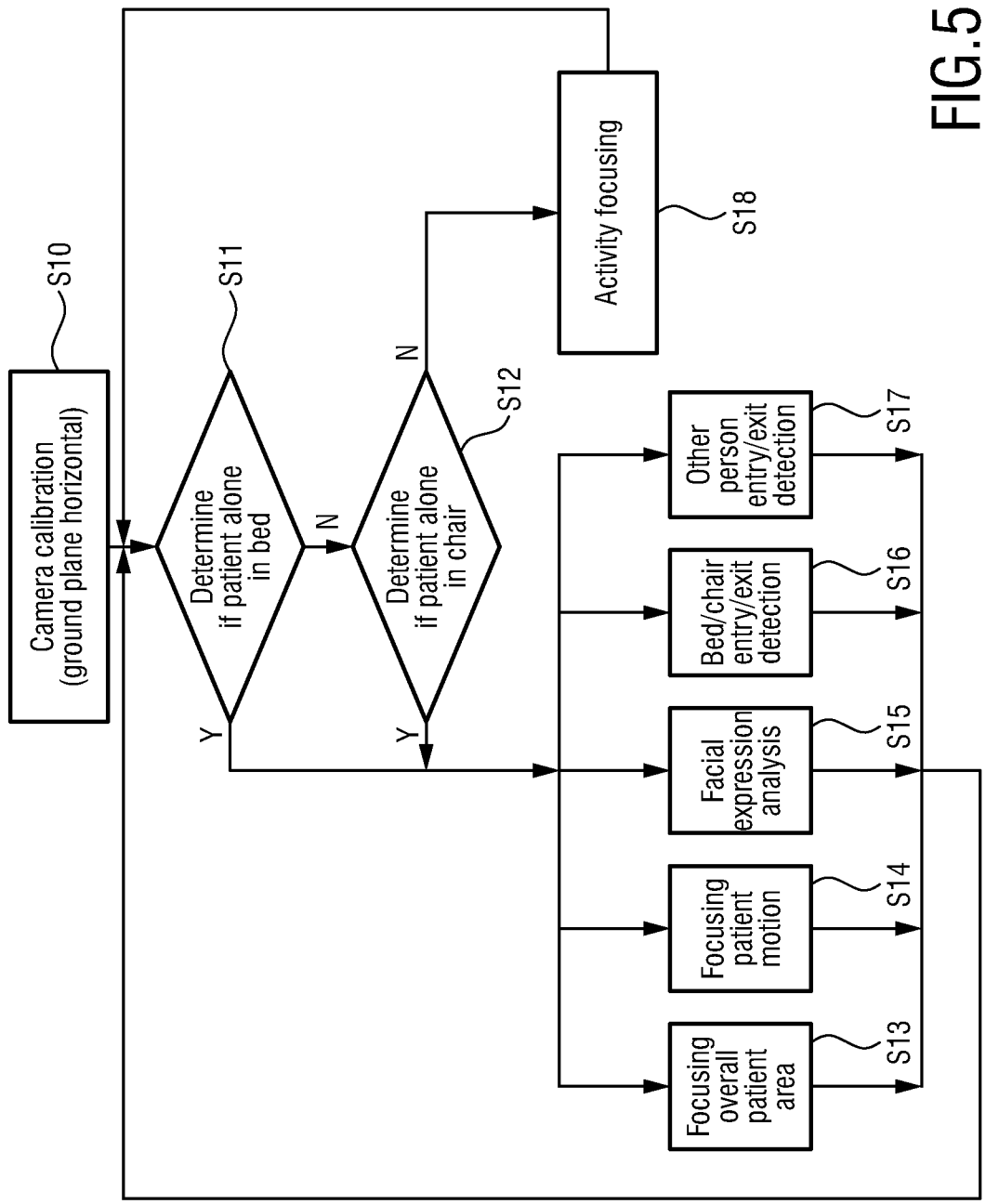
FIG. 5 shows a flow chart of an exemplary embodiment of a monitoring method according to the present invention.

In the first monitoring mode (also called patient monitoring mode) a plurality of options exist. A flow chart of an exemplary embodiment of a monitoring method according to the present invention is shown in FIG. 5. This exemplary embodiment is explained with reference to a similar scenario shown in FIGS. 2 to 4.

In a first step S10 the camera is rotated such that the ground plane is flat. Bed segmentation using a scene segmentation algorithm may be performed, and the image zoom may be adjusted to focus on the bed region.

In a second step S11 it is detected if the patient is in the bed based on a depth profile obtained from the video data. If the patient is not in the bed, the depth profile of the bed is (almost) flat. In an exemplary implementation the distribution (histogram) of the depth values in the bed region is checked. If the patient is not in the bed, the camera will be switched to the second (room) monitoring mode to check if the patient is seated in a chair.

In a third step S12 it is detected if the patient is in a chair. This can be done by checking the depth profile in a surrounding area that is close to the bed region. A chair usually corresponds to a segmented blob from the scene segmentation algorithm. If a chair with patient is not found, the camera will be switched to the second (room) monitoring mode.

If the patient is either in the bed or the chair, various options exist for further monitoring. Motion estimation may be performed to capture more details. The camera will zoom in on areas with small subtle motion especially for the hand region (step S14). If no motion is detected in the zoomed in area for one minute, the camera will zoom out to have the complete bed area in view (step S13).

Prioritization of the zoom in area may be performed. If motion is detected in more than one area in the image with partly subtle motion, it may be decided to zoom in based on priority of the area with subtle motion and only zoom in at the area with highest priority. Typical delirious behavior is mainly manifested by hand motions. Hence, zooming in to optimally detect the motion of the hands is advantageous. A person pose detector (e.g. based on OpenPose detector) may be used to localize the different body parts, such as head, arms, hands and legs.

Focusing on patient facial area may be performed (step S15). This enables the analysis of facial expressions, which may provide important cues about the patient's state, e.g. potential delirium, pain and/or stress.

As another option bed exit or entry may be detected (step S16) such that the camera will automatically be switched to the second (room) monitoring mode.

As another option other person(s) may be detected (step S17). It may e.g. be detected when another person, in addition to the patient, is entering room, in particular the camera view. If the patient is not alone in the monitored area, the camera may be switched to the second monitoring mode to learn about the context of the measurement. Depending on the position of the other person, the focus may be adjusted to a smaller region (third area) of the scene instead of the whole room (first area).

In the second monitoring mode, if the patient is neither in the bed nor in the chair, an activity (motion) level measurement may be made (step S18). Based thereon the camera view may be zoomed and/or shifted to focus on the most intensive activities or interactions.

Figure 6A:
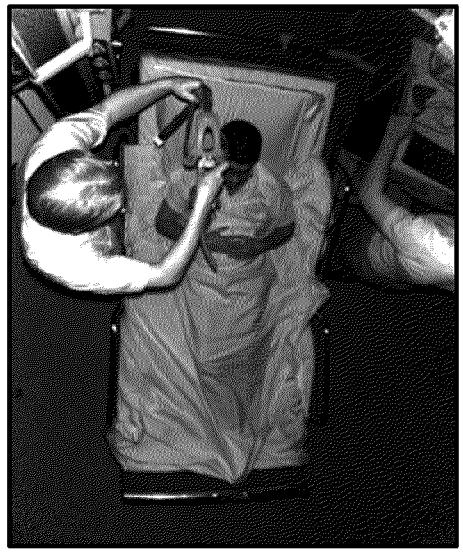
FIG. 6A shows a camera view of a camera mounted at the ceiling above a patient bed.
Figure 6B:
FIG. 6B shows a depth view from the same perspective as the camera view shown in FIG. 6A.

In an embodiment a standard 3D PTZ camera is used that is mounted at the ceiling and facing downwards. A pre-calibration step may be performed to estimate the tilt angle of the camera (with respect to the ground plane, e.g. the floor of the room), and the camera is then mechanically rotated such that the ground plane is flat in the camera view. In another embodiment, a correction of the video data is performed computationally such that the ground plane is arranged in horizontal direction. FIG. 6A shows a camera view of a camera mounted at the ceiling above a patient bed. FIG. 6B shows a depth view from this perspective.

Figure 7A:
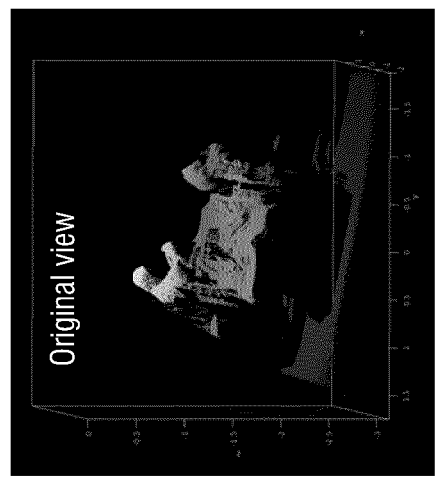
FIG. 7A shows a camera view facing the end of the patient bed.
Figure 7B:
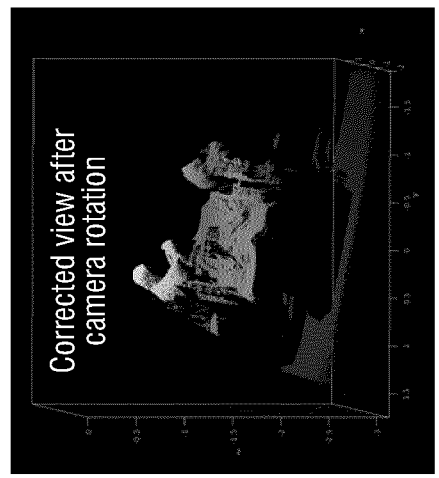
FIG. 7B shows a corrected view after viewing angle correction.

In another embodiment, for convenience of the further analysis, the camera's viewing angle may be corrected such that the ground plane is always horizontal on the X-Y plane. FIG. 7A shows a point cloud representation of the depth data shown in FIG. 6B. This point cloud representation can generally be constructed from a side view image and/or a related top view image. It may be assumed that from the original 3D point clouds (as shown in FIG. 7A in which the viewing angle is facing the end of the patient bed, where two persons are standing next to the bed) up to 0.5 meters (or any other reasonable value that may be set in advance or may be estimated for the particular view) above the farthest points constitute mostly ground pixels. These selected pixels are used to fit a 3D ground plane with a robust method, such as a technique called RANSAC (RANdom SAmple Consensus). The RANSAC based estimation represents a very robust solution due to its ability to handle outliers. Based on the estimated plane parameters, the camera may be rotated such that the ground plane is on the X-Y plane (as shown in FIG. 7B). The Z values of the new point cloud reflect the true height of the scene objects above the ground plane. It shall be noted that other methods instead of the RANSAC algorithm may be applied instead to achieve such a correction.

To determine what to monitor in the room it is determined if there are other people present in the room or if the patient is alone in the room. In an embodiment this may be done as follows.

Figure 8C:
FIG. 8C shows an image of only the persons adjacent to the patient area.
Figure 8B:
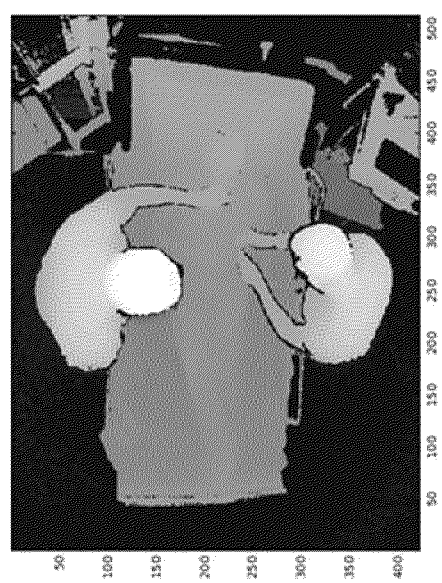
FIG. 8B shows an image of the patient area and persons adjacent to the patient area.
Figure 8A:
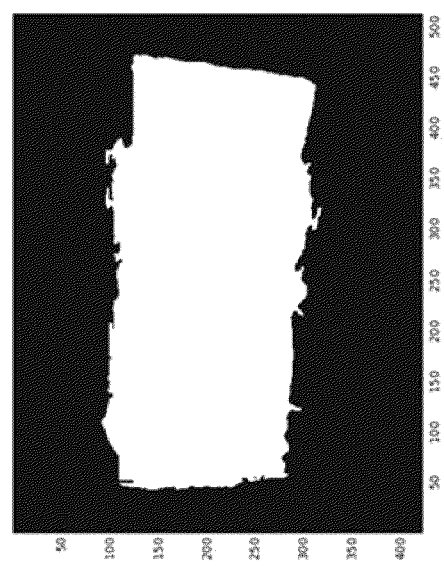
FIG. 8A shows an image of an identified patient area.

In a first step a ROI (region of interest) detection algorithm may be applied to outline the patient area, as e.g. shown in FIG. 8A. This may e.g. be done using the method described in WO 2020/127014 A1. From the depth profile of the patient area (referred to as second area herein), it is known if the patient is in bed or not. If yes, the following step may be carried out to decide if the patient is alone in the room.

A motion map may be generated from the video data, e.g. based on frame differencing, H3DRS or optical flow. If the detected motion area (outside the patient area) is/are not adjacent to the patient area, it may be assumed that there are other people in the room but they are not physically interacting with the patient.

If the motion field (as e.g. shown in FIGS. 8B and 8C) has intersections with the patient area, the associated real depth values of these motion components may further be checked. Based on the above it can be derived if there exist interactions between the patient area and other people (such nurses, doctors, visitors, etc.). The camera may then be controlled to zoom out such that the persons interacting with the patient and the patient area are in the field of view, i.e. the camera is controlled to monitor a third area that is larger than the patient area.

If the motion is outside the patient area, the camera may be controlled to switch to the patient monitoring mode (second monitoring mode) and to zoom in to the patient area.

If there is no patient detected in the bed area the detected other connected components (e.g. a blob) surrounding the bed area may further be checked in order to locate potential chair existence. This again can be confirmed by the shape and depth profile of the blob. If the patient is in the chair, the same logic as explained above for the situation in which the patient is in the bed may be followed.

For detecting activities or motion from video data many different algorithms are generally known, such as algorithms using background subtraction (determining the difference between a current video frame and a reference frame or the preceding video frame) or algorithms using models based on optical flow. For determining if activities represent motion of a person known algorithms can be applied as well, such as algorithms evaluation texture, shape, motion pattern, etc. of image regions showing activities. Various algorithms are e.g. described in Paul, M., Hague, S. M. E. & Chakraborty, S. Human detection in surveillance videos and its applications—a review. *EURASIP J. Adv. Signal Process.* 2013, 176 (2013). To distinguish if there are different persons can e.g. be accomplished by detecting if regions with activities are clearly separated.

If the patient is alone in the room, one or more of the following analytic features or modes for real-time monitoring may be applied. They can be manually chosen or triggered by events that are automatically detected.

In an embodiment full-bed monitoring may be performed. In this operation, the zoom level of the camera may be adjusted such that the bed area occupies most of the field-of-view (e.g. 80%). An example is shown in FIG. 8A. This operation can be used as default operation.

In another embodiment in-bed motion focusing may be performed. The patient motion while lying on bed provides important hints for delirium detection, such as picking at bedsheets. By motion detection small motions of the patient can be captured and the camera can be zoomed in for better details. This is not only done for better visualization but also provides better (high-resolution) inputs for algorithms that are used for further analysis of these subtle motion. For detecting delirium from subtle motion a method as e.g. described in US 2014/235969 A may be used.

In another embodiment facial expression analysis may be performed. Facial expression is one important communication cue for ICU patients. For this operation, an automatic face detection algorithm may be used such as described in Weon SH., Joo SI., Choi HI. (2014) Using Depth Information for Real-Time Face Detection. In: Stephanidis C. (eds) HCI International 2014—Posters' Extended Abstracts. HCI 2014, Communications in Computer and Information Science, vol 434, Springer, to find the facial region. The PTZ camera can zoom in to this region. The images can be used for visual inspection or fed into an automatic facial expression analysis algorithm. This operation can be selected manually or triggered by facial motion in a similar way as described above.

In another embodiment bed entry/exit detection may be performed. The bed boundary may be constantly monitored to detect any event of bed entry/exit. This can e.g. be achieved by checking the motion direction over the bed boundary, either from outside in or from inside out. If the bed entry/exit event is detected the camera may be controlled to zoom level to monitor the full room. For detecting bed entry/exit a method as e.g. described in US 2019/228866 A1 or US 2019/192052 A1 may be used.

In another embodiment entry/exit detection of another person (e.g. nurse or visitor) may be performed. It may be detected when another person next to the patient is entering the image. Knowing this, the camera may adjust its zooming behavior accordingly.

For a continuous overview of all activities in the room the camera may be combined with e.g. a fish eye camera so all activities in the room can be registered. Images of such an additional camera may be analysed for motion hot spots. It will provide this information for the analysis and will be used to return from patient monitoring mode to room monitoring mode (first monitoring mode).

For a single PTZ camera, digital zoom may be used to focus on interested regions while using the original full resolution image for continuous full-room monitoring.

The present invention provides the ability of camera-based ICU room monitoring, but may also be used for general ward, geriatric ward and other healthcare setting using camera monitoring. Further, it enables automatic characterization of ICU patient motion. Further options that are provided by the present invention include delirium detection, vital signs monitoring, decubitus management, and fall management.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A device for controlling a camera, the device comprising:
   an input configured to obtain video data from the camera;
   an image processor configured to determine from the obtained video data if a particular person is present alone in a first area monitored by the camera;
   a controller configured to generate a control signal for controlling the camera to operate in a first monitoring mode or a second monitoring mode based on the determination by the image processor if the particular person is present alone in the first area monitored by the camera, wherein the control signal is configured to control the camera to operate in the first monitoring mode in which the first area or a third area is monitored in case the particular person is not alone in the first area and to operate in the second monitoring mode in which a second area is monitored in case the particular person is alone in the first area, wherein the second area is smaller than the first area and substantially includes the particular person and the third area is larger than the second area but smaller than the first area and includes one or more persons, other than the particular person, present in the first area; and
   an output configured to output the control signal to the camera.

2. The device as claimed in claim 1,
wherein the image processor is configured to determine from the obtained video data if the particular person is present alone in the first area by detecting activities in the first area and determining if the activities represent motion of one or more persons.

3. The device as claimed in claim 2,
wherein the image processor is configured to determine, in case one or more other persons are detected in the first area, if one or more of them is within or overlapping with or adjacent to the second area, and
wherein the controller is configured to generate, in case one or more of the other persons is within or overlapping with or adjacent to the second area, a control signal for controlling the camera to operate in the first monitoring mode and to monitor the third area substantially including the particular person and the one or more of the other persons.

4. The device as claimed in claim 3,
wherein the controller is configured to generate, in case none of the other persons is within or overlapping with or adjacent to the second area, a control signal for controlling the camera to operate in the second monitoring mode or to operate in the first monitoring mode and to monitor the first area.

5. The device as claimed in claim 1,
wherein the image processor is configured to detect in the obtained video data a particular furniture to determine if the particular person is present on or at said furniture and to define the area substantially including the particular furniture on or at which the particular person is present as second area.

6. The device as claimed in claim 5,
wherein the image processor is configured to detect the particular furniture and determine if the particular person is present on or at said furniture based on depth information of said video data, wherein the particular furniture is a bed or chair.

7. The device as claimed in claim 1,
wherein the image processor is configured to correct obtained video data by correcting the viewing angle of the camera such that a ground plane is arranged in horizontal direction and to use the corrected video data for determining if a particular person is present alone in the first area.

8. The device as claimed in claim 1,
wherein the controller is configured to generate a control signal for controlling the camera to rotate such that a ground plane is arranged in horizontal direction.

9. The device as claimed in claim 1,
wherein the image processor is configured to perform, in the second monitoring mode, one or more of a facial expression analysis of facial expressions of the particular person, a bed exit detection to detect if the particular person has exited or entered or is in risk to fall off the bed, a motion detection to detect specific motions of the particular person, a vital sign detection to detect one or more vital signs of the particular person, and an approach detection to detect if one or more other persons approach or leave the particular person.

10. The device as claimed in claim 1, wherein the first area is monitored in case another person is present in another area of the first area which is not adjacent to the particular person or second area.

11. The device of claim 1, wherein the image processor is further configured to:

generate a motion map;
compare the generated motion map with a patient area determined by a region-of-interest detection algorithm; and
determine that the particular patient is not alone in the room if motion components detected outside the patient area interact with or are adjacent to the patient area, thereby causing the controller to generate a control signal to switch the camera from a second monitoring mode monitoring the second area to a first monitoring mode monitoring the third area.

12. The device of claim 11, wherein the camera is zoomed in on the second area in the second monitoring mode and zooms out as part of the switch to the first monitoring mode.

13. The device according to claim 1, wherein monitoring the first area includes setting the camera to a maximum field of view, and monitoring second and third areas includes setting the camera set to fields of view which are less than the maximum field of view.

14. The device according to claim 13, wherein monitoring a first area or third area with a camera includes zooming out with the camera and monitoring a second area with a camera includes zooming in with the camera, such that switching between first and second monitoring modes includes causing the camera to switch between zoom in and zoom out functions to change the field of view.

15. A System for monitoring an area, the system comprising:
a camera configured to operate in a first monitoring mode and a second monitoring mode according to a control signal,
a device as claimed in claim 1 for generating and outputting a control signal to the camera.

16. The system as claimed in claim 15,
wherein the camera is configured to pan and/or to tilt and/or to zoom under control of the control signal or is a 3D pan tilt zoom camera.

17. The system as claimed in claim 15,
wherein the camera is configured to be fixedly mounted in a room or to be movably positioned in a room.

18. The system as claimed in claim 15,
further comprising a fish-eye camera configured to always monitor the first area or an even larger area.

19. A method for controlling a camera, the method comprising:
obtaining video data from the camera;
determining from the obtained video data if a particular person is present alone in a first area monitored by the camera;
generating a control signal for controlling the camera to operate in a first monitoring mode or a second monitoring mode based on the determination if the particular person is present alone in the first area monitored by the camera, wherein the control signal is configured to control the camera to operate in the first monitoring mode in which the first area or a third area is monitored in case the particular person is not alone in the first area and to operate in the second monitoring mode in which a second area is monitored in case the particular person is alone in the first area, wherein the second area is smaller than the first area and substantially includes the particular person and the third area is larger than the second area but smaller than the first area and includes one or more persons, other than the particular person, present in the first area; and
outputting the control signal to the camera.

20. A non-transitory computer-readable medium that stores therein a computer program product, which, when executed on a processor causes the steps of the method as claimed in claim 19 to be performed.

\* \* \* \* \*